March 8, 1966    S. G. BEST    3,239,141
HYDRAULIC COMPUTER
Filed June 5, 1964
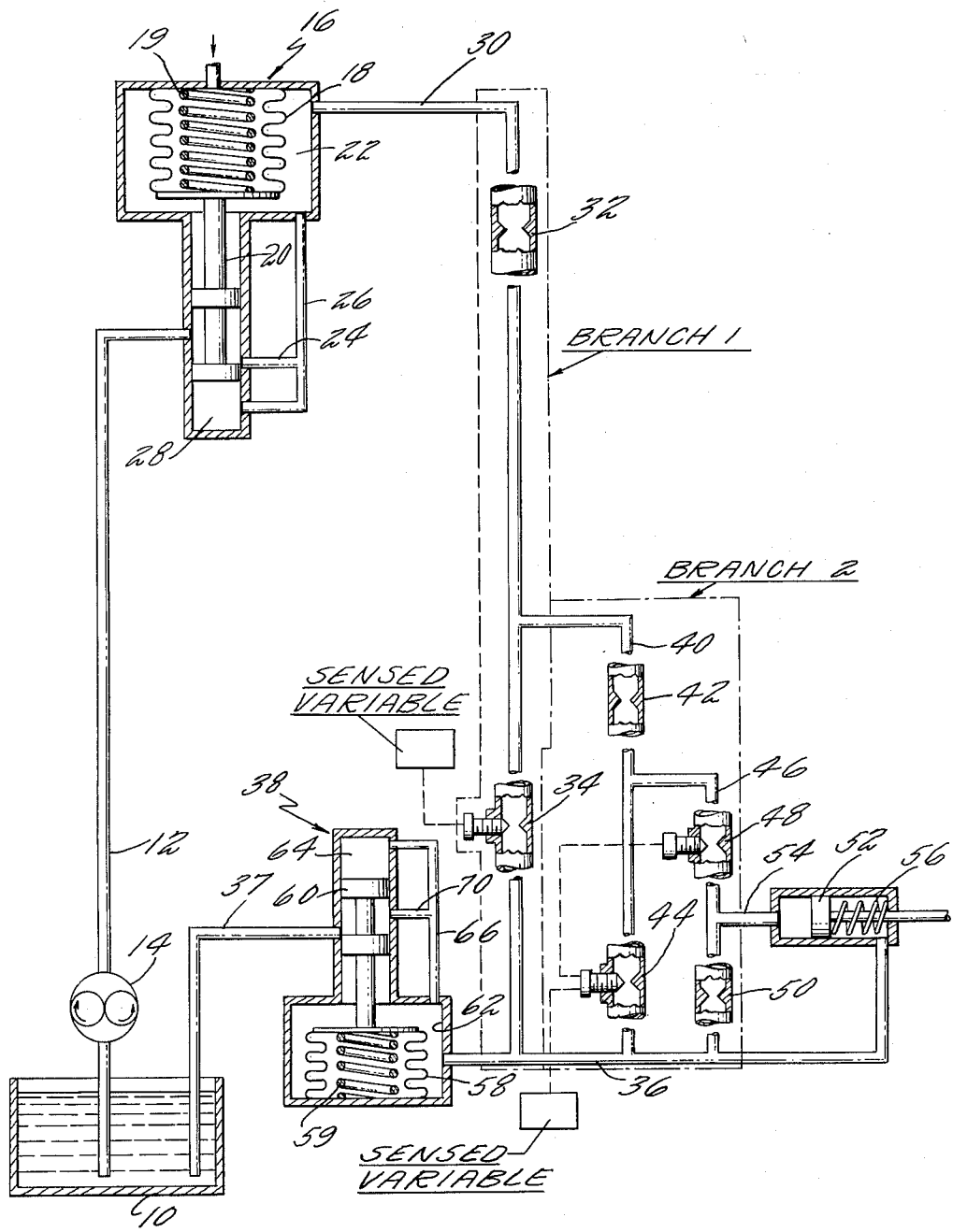
INVENTOR
STANLEY G. BEST
BY Norman Friedland
ATTORNEY United States Patent Office 3,239,141
Patented Mar. 8, 1966

3,239,141
HYDRAULIC COMPUTER
Stanley G. Best, Manchester, Conn., assignor to United
Aircraft Corporation, East Hartford, Conn., a corporation of Delaware
Filed June 5, 1964, Ser. No. 372,820
8 Claims. (Cl. 235—200)

This invention relates to hydraulic computing devices and particularly to a hydraulic system producing an output signal which is the product of a plurality of variables.

As is generally well-known in the art, multiplication of sensed variables can be effectuated by bleeding hydraulic fluid through suitably disposed restrictions. The variables intended to be measured serve to adjust the area of some of these restrictions in order to control the pressure drop across fixed restrictions for producing hydraulic pressure indicative of the signal sensed. The hydraulic circuitry generally comprises a network of branched flow lines wherein each of the branches contains a fixed and a variable restriction. The areas of the variable restrictions are made to vary as a function of the sensed variables whose product is desired.

In the heretofore known hydraulic multiplication systems a disadvantage is evident to the extent that the multiplication range is limited. This is due to the fact that errors resulting from mismatching of Reynolds' number in cooperating restrictions adversely affect the output signal. Generally, Reynolds' number at the upstream and downstream restrictions in the branches are matched at the mid-point of the operating range. When the multiplication of a sensed variable is extended, the area of the variable restriction, obviously, must vary over an extended range. Inherently, this has the tendency of mismatching the Reynolds' number of the upstream and downstream orifices as the area of the variable restriction deviates further away from the mid-point of the range.

It is to be understood that the Reynolds number at the orifices are matched where the value of the Reynolds number at the selected area of the orifices will fall on the line of constant coefficient of discharge for fluid through an orifice ($C_d$) in a plot of $C_d$ vs. Reynolds numbers.

I have found that I can obviate this disadvantage by providing an additional branch line having a fixed and variable restriction and adjusting the area of this restriction as a function of the area of the variable responding restriction in the adjacent branch line.

Hence, it is an object of this invention to increase the range of multiplication of one of the variables sensed, by obviating the disadvantages enumerated above.

Other features and advantages will be apparent from the specification and claims and the accompanying drawing which illustrates an embodiment of the invention.

Referring now to the sole figure which is a schematic representation of a hydraulic system incorporating this invention. As shown, fluid from reservoir 10 is pressurized by schematically shown pump 14 and fed to the pressure regulator generally indicated by numeral 16 via line 12. Pressure regulator 16 comprises bellows 18, spool valve 20 and suitable flow passages. Fluid (hydraulic or pneumatic) indicative of the variable being sensed is admitted internally of bellows 18. Hydraulic fluid issuing from line 12 is directed to chambers 22 and 28 via lines 24 and 26. The force on spool 20 created by the pressure in chamber 28 and the force externally of bellows 18 created by the pressure in chamber 22 oppose the combined forces of the pressure created by the fluid internally of bellows 18 and spring 19 disposed therein. The forces felt by bellows 18 serve to position spool valve 20 in order to maintain the pressure of the fluid in chamber 22 equal to a value indicative of the pressure of the variable sensed internally of bellows 18 and the force of spring 19. That is to say, that the hydraulic fluid in chamber 22 will equal the sensed variable plus the spring force, say 100 pounds per square inch (p.s.i.). At this point spool valve 20 will be at its null or balanced position. The pressure in chamber 22 is set 100 p.s.i. above the sensed variable pressure because of the method employed in obtaining absolute pressure reference as will be explained hereinbelow.

Next, referring to the drain pressure regulator generally indicated by numeral 38 which comprises evacuated bellows 58, spool valve 60 and suitable flow passages. Hydraulic fluid in drain line 36 is admitted into chamber 62 where it externally surrounds bellows 58. Fluid discharging from chamber 62 is simultaneously fed to spool valve 60 and chamber 64. The forces felt by bellows 58 created by the pressure of the fluid in chamber 64 (transmitted through spool valve 60), the pressure in chamber 62 and spring 59 disposed in bellows 58, serve to regulate the pressure in chamber 62 and hence line 36 at a constant valve, say 100 p.s.i. This is accomplished by metering fluid discharging from line 70 to reservoir 10 via line 37. When the pressure in chamber 62 equals the 100 p.s.i. value, the spool 60 will be nulled or in the balanced position. It is therefore apparent that the pressure in chamber 22 (which is the value of the sensed variable plus 100 p.s.i.) minus the 100 p.s.i. established by the drain pressure regulator 16, equals a value which is indicative of the value of the sensed variable.

It is apparent from the foregoing that the pressure drop of the hydraulic fluid in line 30 communicating with chamber 22 and the hydraulic fluid in line 36 is equivalent to the pressure internally of bellows 18 which is the value of the variable being sensed. This hydraulic fluid is then fed to branch 1 of the hydraulic computing system where it is directed through fixed orifice 32. As noted, this orifice is disposed in series with the variable orifice 34 which variable orifice is positioned as a function of a variable intended to be multiplied. Obviously, the position of the variable restrictor may be made responsive to any variable intended to be multiplied. Fixed orifice 32 and variable orifice 34 serve to create a pressure drop in branch 1 which is indicative of the product of the variables being sensed as noted above. The fluid discharging from variable orifice 34 eventually is returned to reservoir 10 through the regulated drain line 36 and pressure regulator 38 and drain line 37.

A further multiplication is effectuated by directing a portion of the fluid intermediate restrictors 32 and 34 through line 40, fixed restriction 42 and variable restriction 44. The area of variable restrictor 44 varies as a function of the other variable intended to be multiplied so that it, in conjunction with the upstream fixed restriction 42, modifies the pressure drop created by branch 1. This portion of branch 2, together with the other portion to be described, creates a pressure drop in branch 2 indicative of the product of all of the sensed variables. Fluid discharging from variable restriction 44 is eventually directed to drain via regulated drain line 36, pressure regulator 38 and line 37.

In accordance with this invention an additional line 46 comprising variable restriction 48 and fixed restriction 50 communicates with the fluid intermediate fixed restriction 42 and variable restriction 44. Fluid discharging through fixed restriction 50 is returned to reservoir 10 via regulated drain line 36, pressure regulator 38 and drain line 37. As schematically shown variable restrictors 44 and 48 are ganged so that opening one will cause the other to close a corresponding amount. The addition of line 46 and the attendant restrictions 48 and 50 serve to increase the effectiveness of the multiplication obtained by branch 2. In this manner I have found that it is possible to substantially double the effectiveness of the multiplication effect of variable regulating restrictor 44 without introducing Reynolds' number errors. Of course, additional multiplication may be effectuated by increasing the number of branches.

The output which is the product of the variables being sensed is evident between fixed restriction 50 and variable restriction 48. This signal may be utilized in any suitable manner as for example by controlling hydraulic piston 52 as a function of the product of the variables being sensed. This is accomplished by directing pressure intermediate fixed restriction 50 and variable restriction 48 through branch line 54 to act on the left-hand side of piston 52. Since piston 52 is sensitive to the force differential created by the computed pressure, spring 56 and the referenced pressure, its position will be indicative of the product of the variables being measured.

The reason why hydraulic piston 52 moves as a function of the product of the variables being sensed may be better understood by considering the mathematical relationship of the restriction areas and pressures in the computing circuit. As is well known, the mathematical equation for the pressure ratio across the upstream restriction in a conduit having restrictions disposed in series relationship can be expressed as follows:

(1) $$\frac{P_2}{P_1} = \frac{1}{1 + \frac{(A_1)^2}{(A_2)^2}}$$

where $P_1$ = upstream pressure
$P_2$ = pressure intermediate the two restrictions
$A_1$ = the area of the upstream restriction
$A_2$ = the area of the downstream restriction This is based on a well-known flow equation, i.e., that pressure drop across any restriction equals a constant times the flow divided by the area squared $$\left(\Delta P = k \text{ (constant)} \times \left(\frac{W}{A}\right)^2\right)$$

Thus,
(2) The pressure drop across $$A_1 = P_1 - P_2 = k\left(\frac{W}{A_1}\right)^2$$

(3) The pressure drop across $$A_2 = k\left(\frac{W}{A_2}\right)^2$$

Because W is the same in $A_1$ and $A_2$, the equation in paragraphs (2), (3) can be rewritten as:

(4) $$\frac{P_2}{P_1} = \frac{P_2}{(P_1 - P_2) + P_2} = \frac{k\left(\frac{W}{A_2}\right)^2}{k\left(\frac{W}{A_1}\right)^2 + k\left(\frac{W}{A_2}\right)^2}$$

Factoring gives:

(5) $$\frac{P_2}{P_1} = \frac{\frac{1}{(A_2)^2}}{\frac{1}{(A_1)^2} + \frac{1}{(A_2)^2}} = \frac{1}{1 + \frac{(A_2)^2}{(A_1)^2}}$$

Applying the above formula to the sole figure and considering P represents pressure, A represents area, $f$ represents a function of, and the subscripts represent the applicable restriction and passages, then:

$$\frac{P_{54}}{P_{46}} = \frac{1}{1 + \left(\frac{A_{50}}{A_{48}}\right)^2} = f(A_{48})$$

Since $A_{50}$, $A_{42}$, and $A_{32}$ are all fixed

The effective area from $46 = A_{44} + f(A_{48}) = f(A_{48})$ (Since $A_{44}$ is ganged with $A_{48}$ it is always known when $A_{48}$ is known.)

Thus, $$\frac{P_{46}}{P_{40}} = \frac{1}{1 + \left(\frac{A_{42}}{f(A_{48})}\right)^2} = f(A_{48})$$

and $$\frac{P_{54}}{P_{40}} = \frac{P_{46}}{P_{40}} \times \frac{P_{54}}{P_{46}} = f_1(A_{48}) \times f(A_{48}) = f(A_{48})$$

and the effective area from $40 = A_{34} + f(A_{48})$

However, since $A_{44}$ goes down as $A_{48}$ goes up, it is possible to proportion things so that $f(A_{48})$ changes only a small amount, or none at all over the operating range.

$$\frac{P_{40}}{P_{30}} = \frac{1}{1 + \left[\frac{A_{34} + f(A_{48})}{A_{32}}\right]^2}$$

hence $$\frac{P_{40}}{P_{30}} = f_7(A_{34})$$

and the overall $$\frac{P_{54}}{P_{30}} = \frac{P_{40}}{P_{30}} = \frac{P_{54}}{P_{40}} = f(A_{48}) \times f(A_{34})$$

Since $$\frac{P_{54}}{P_{40}} = f(A_{48}) \times f(A_{34})$$

then the pressure in passage 54 is equal to the areas of restrictions 34 and 48 which are varied as a function of the sensed variables. Thus the product of independent variables can be obtained by this hydraulic circuit.

It is to be understood that the invention is not limited to the specific embodiment herein illustrated and described but may be used in other ways without departure from its spirit as defined by the following claims.

What is claimed is:

1. A hydraulic computing system for obtaining the product of sensed variables, means for producing a pressure drop whose value is indicative of one of the sensed variables to be multiplied, means including a pair of flow lines each of which contain a variable restriction, one of which varies as a function of another sensed variable for modifying said pressure drop to produce another pressure drop whose value is indicative of the product of the two variables, and means for interconnecting said variable restrictions so that when one moves to an opened position the other moves to a closed position.

2. A hydraulic computing system for obtaining the product of sensed variables, a source of hydraulic fluid under pressure and a drain, control means connected to said source for producing a pressure drop whose value is indicative of one of the sensed variables to be multiplied, multiplying means responsive to another variable modifying said pressure drop for producing a pressure drop whose value is indicative of the product of the two sensed variables, said means including a first fluid flow line interconnecting said control means and drain, a first fixed restriction and a first variable restriction serially disposed in said first fluid flow line, a second fluid flow line interconnecting said drain and said first flow line at a point intermediate said first fixed restriction and said first variable restriction, a second variable restriction and a second fixed restriction serially disposed in said second flow line and means interconnecting said first variable restriction and said second variable restriction so that when one moves to a closed position the other moves to an opened position and vice versa.

3. Means for obtaining the product of a plurality of sensed variables including a hydraulic flow system having at least two branch flow lines, one of said branch flow lines having serially spaced restrictions, the area of one of said restrictions being varied as a function of a sensed variable, the other branch flow line also having two serially spaced restrictions and the area of one of said restrictions being varied as a function of another variable being sensed, said other branch flow line communicating with said first branch line at a point located intermediate the two restrictions disposed therein, a third branch line having a pair of serially spaced restrictions, the area of one of said restrictions varying as a function of the area of the varying restrictions disposed in said second branch line, all of said branch lines communicating with a referenced pressure source, and means for controlling said referenced pressure source.

4. Means as defined in claim 3 wherein one of the restrictions in each of the branch lines is fixed.

5. In a hydraulic computing system for producing an output signal commensurate with the product of sensed variables, a source of pressure, and a regulated pressurized drain, a variable regulator communicating with said source for creating a hydraulic pressure whose value is proportional to a sensed variable, a first branch line interconnecting said regulator and said drain, a first fixed and a first variable restriction disposed in said first branch line, and a second branch line interconnecting said first branch line at a point intermediate the first fixed and first variable restrictions and drain, a second fixed and a second variable restriction disposed in said second branch line, a third branch line interconnecting said second branch line at a point intermediate the second fixed and second variable restriction and drain, a third fixed and third variable restriction disposed in said third branch line, the area of said third variable restriction varying as a function of the area of said second variable restriction, and means for varying said first variable restriction and said second variable restriction.

6. A hydraulic computing system for obtaining the product of sensed variables, means for producing a pressure drop whose value is indicative of one of the sensed variables to be multiplied, means including a pair of flow lines each of which contain a variable restriction, one of which varies as a function of another sensed variable for modifying said pressure drop to produce another pressure drop whose value is indicative of the product of the two variables, and means for interconnecting said variable restrictions so that one variable restriction moves as a function of the other variable restriction.

7. A hydraulic computing system for obtaining the product of sensed variables, means for producing a pressure drop whose value is indicative of one of the sensed variables to be multiplied, means including a pair of flow lines each of which contain a pair of serially disposed restrictions, one of said restrictions in one of said flow lines being varied as a function of another sensed variable for modifying said pressure drop to produce another pressure drop whose value is indicative of the product of the two variables, and one of the pair of restrictions in the other flow line being varied as a function of the first mentioned variable restriction.

8. A hydraulic computing system as claimed in claim 7 wherein the other restrictions of each of the pair of restrictions are fixed.

No references cited.

LOUIS J. CAPOZI, *Primary Examiner.*

LEO SMILOW, *Examiner.*

C. G. COVELL, *Assistant Examiner.*